March 25, 1969 R. SIEFERT ET AL 3,435,313
MAGNETIC TIMING IMPULSE SWITCH
Filed Sept. 7, 1965

United States Patent Office 3,435,313
Patented Mar. 25, 1969

3,435,313
MAGNETIC TIMING IMPULSE SWITCH
Roland Siefert and Rolf Charrier, Bad Durrheim, Germany, assignors to Kienzle Uhrenfabriken G.m.b.H., Schwenningen am Neckar, Germany, a limited-liability company of Germany
Filed Sept. 7, 1965, Ser. No. 485,475
Int. Cl. H02k 33/00; H01h 3/54, 9/00
U.S. Cl. 318—138                                                3 Claims

ABSTRACT OF THE DISCLOSURE

A motor having permanently magnetized rotor wherein the rotor controls current to a stator coil via a magnetic reed switch. An auxiliary movable magnet varies the effect of the rotor on the switch. In an intermediately spring driven clockwork the amount of deformation of its spring governs the position of the auxiliary magnet.

---

This invention relates to direct current motors suitable especially as drive motors for electrically wound time pieces.

Direct current motors for this purpose having commutators are found in the prior art, which motors rewind a spring periodically. The closure and opening of the control switch for these motors is effected by the drive works through a control which, in one position, closes the switch, and in another position opens the switch, as shown in German Patent No. 1,050,275. The motor control is so designed that upon unwinding of the spring to a certain state, a control member comes in operative engagement with other control elements. A switch pin moves brushes.

In another kind of control the magnetic forces of a stator and the reaction force of the winding spring operate on the rotor so as to produce an in-and-out switching of the motor dependent of the state of exhaustion of the spring, as shown in German Patent No. 1,097,912.

The motor of the present invention employs no commutator, but instead, a magnetically sensitive contact or leaf switch. The rotor consists of a number of poles produced by a permanent magnet which poles cooperate with one or more fixed positioned coils as a stator. The control of the drive current for the coils is effected through a magnetically sensitive switch. The opening and closing of the switch for the motor is carried out by means of an auxiliary magnet movable relative to the switch, whereby the position of the auxiliary magnet relative to the switch is determined by the state of winding of the spring.

When the main spring of the clock works reaches an unwound state, that is, the state of lowest normal potential, the auxiliary magnet is moved toward the magnetically sensitive switch, hereinafter called a reed switch, thereby the magnetic leaves or prongs of the switch receive an added magnetization of predetermined value. The position of rest for the rotor is so chosen that a given polarity magnetic pole of the rotor near the switch is aided by the auxiliary magnet to close the reed switch. The coils thereby become energized so that the rotor turns. The next succeeding poles produce a counter magnetic field acting on the switch so that the switch then opens and current to the coil is interrupted. After that, the following pole with the same polarity as the first mentioned rotor pole, closes the switch. The coils are therefore fed with a pulsating direction current. When the spring serving as drive has reached its maximum state of winding or tension, the auxiliary magnet is moved away so that the contacts of the reed switch cannot close.

The invention may include two magnetically sensitive switches. When the rotor turns, one switch is opened and the other closed. At least two stator coils are then used and in this situation one coil is always energized and the other not. For each alternation of polarity, due to each succeeding pole being of opposite polarity at the switches, the rotor is given a turning impulse. The switching ensues while the auxiliary magnets are at the position corresponding to the lowest degree of winding of the drive spring and then change at maximum degree of winding.

By eliminating the commutator the motor is safely reliably operated without open sparking and so avoids the undersirable features of mechanical switches.

The present switching mechanism has an auxiliary or control magnet movable toward the switch in dependence on the state of winding of the winding spring. The mechanism operates without ordinary contacts and is consequently very reliable.

The contacts in the reed switch are protected from other outside influences other than magnetism. They are sealed in a glass tube with a filling of protective gas. There is the advantage of obtaining a high speed of turning since with the reed switches the switching can be as great as 400 c.p.s.

A sure closure is always obtained since the force on the contacts is relatively large. The noise of brushes and slip rings is not present so that in use with clocks the necessary highly efficient sound-deadening partitions and the like can be eliminated.

Self-starting of the motor is possible with simple means. A specific direction of rotation is obtained by corresponding positioning of the coil with respect to the poles of the rotor. By the high precision of the switching point during turning the overall dissipation of energy due to angular off-setting is held to a neligible amount.

Figure 1:
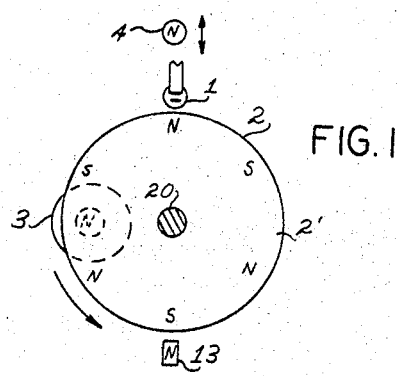
FIGURE 1 is a diagrammatic end view of one form of the motor.
Figure 2:
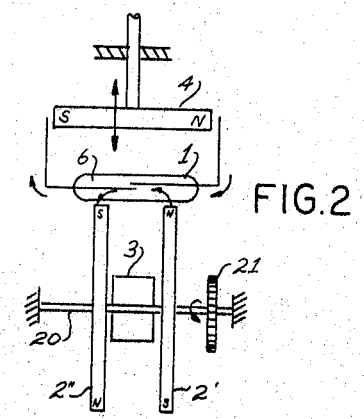
FIGURE 2 is a diagrammatic side view of the motor of FIGURE 1.

In FIGURE 1 all polarities are indicated as viewed from the right in FIGURE 2.

The character 1 represents a magnetically sensitive reed switch which is mounted fast relative to one or more magnetized discs forming a rotor 2 fixed on a shaft 20. The switch 1 opens and closes the energizing circuit for feeding a fixed working coil 3 axially parallel with and between the discs, which coil cooperates with successive polarized portions of the diametrically polarized discs. Each disc is polarized along three equiangularly spaced diameters as shown in FIGURE 1. The polarities of the discs are such that registering pole portions of the two discs are of opposite polarity as shown in FIGURE 2. The shaft 20 is provided with power transmitting means such as a pinion 21.

When the winding spring reaches the state of minimum working stress, an auxiliary or control magnet 4 is moved toward the reed switch. The leaves of the switch are thereby subjected to the magnetic field of the control magnet having a predetermined strength. The rest position of the rotor is hence so chosen that the poles of the rotor situated near the switch increases the action of the control magnet on the switch so that the switch closes and the coil is energized, and the rotor is given an impulse in the direction of the arrow. Upon a pole change at the switch i.e. upon an alternation of north to south as shown in FIGURE 1 due to a turn of the rotor through about 30° the switch opens again due to the influence of approaching poles which neutralize the effect of the control magnet. Momentum will carry the rotor on for another 60° where the rotor magnets begin strengthening the field for again closing the switch. It is thus evident that the angular duration of the impulse can be varied from slightly less than 60° down to nearly zero depending on the amount of effect of the control magnet. Of course any number of pole pairs may be used with appropriate angular positions of the coil relative to the switch.

The rotating system can reach a rest position as shown in FIGURE 1 merely by having additional weight at the lowermost south pole which affords only one rest position in the whole 360° of turning. A very weak fixed biasing magnet 13 sufficiently away from the switch, but near the periphery of the discs can detain the rotor in two additional positions equally suitable for self starting. Whatever means is used to bias the rotor to a given position, it is preferable that such a position afford a rest position (when the control magnet is of polarity to strengthen action of the rotor poles as near as possible to the switch) in which the axis of the coil lies about midway between appropriate rotor poles. This allows nearly 30° each way for deviation from the assumed rest position without danger of turning in the undesired direction. This is especially advantageous if there is any momentary over-travel when the control magnet is brought to the switch when poles are not in exact registry with the switch, for the control magnet may then furnish nearly all the flux for the switch.

In FIGURE 2 the switch is shown closed, that is to say, the flux of the control magnet 4 and that of the rotor discs 2' and 2" are in the same direction and thus the switch becomes closed. Upon a pole shift by turning of the rotor, a counter flux weakens that of the control magnet and so that switch opens. It is to be noted that only the exterior or stray field of the rotor is employed for opening and closing of the switch.

Figure 3:
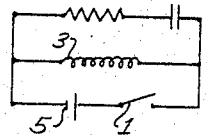
FIGURE 3 shows the circuitry for the motor of FIGURES 1 and 2.
Figure 4:
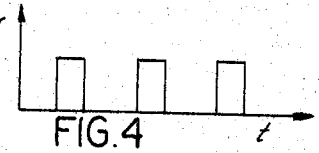
FIGURE 4 is a plot of current used by the motor against time.

FIGURE 3 shows the switch circuit for the above described motor wherein a source of current such as a battery 5 is provided. For the suppression of sparking, serially connected capacitance and resistance bridge the switch.

Figure 5:
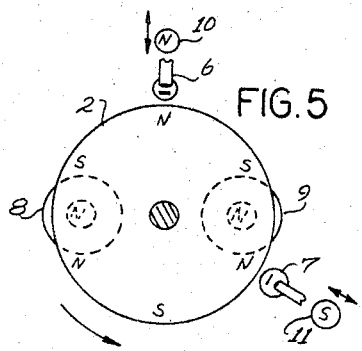
FIGURE 5 shows another form of the motor having two coils.
Figure 7:
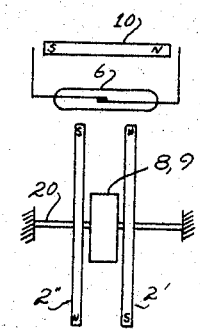
Figure 6:
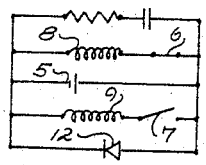
FIGURE 6 shows the switching arrangement for one coil of motor of FIGURE 5, and FIGURE 7 the arrangement for the second coil.

In FIGURE 5 two switches 6 and 7 are employed for two coils 8 and 9 respectively. The movement of the two control magnets 10 and 11 is again dependent on the degree of wind of the winding spring. The coils are situated with respect to the poles of the rotor and the switches so that only one direction of rotation is possible as shown by the arrow. The control magnets are so chosen that for the turning direction shown, the switch 6 is closed and the switch 7 is open. Hence current flows through coil 8 while none flows through coil 9. It is naturally possible then that the switch 7 be near a south pole (as viewed from the end) and the polarity of the control magnet 11 is thus the reverse of that of magnet 4. When the control switches are 120° apart and the coils 180° the number of impulses per revolution is doubled. One switch is always open when the other is closed. If both control magnets are sufficiently near the switches, one switch can always be closed while the other is open.

Figure 8:
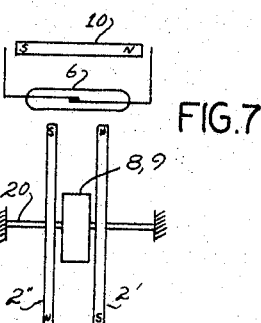
FIGURE 8 shows the circuitry for motor shown in FIGURE 5.

FIGURE 8 shows the circuitry for FIGURE 5. A diode 12 containing an easily ionized gas is shunted across the current supply to aid in stabilizing the speed.

Figure 9:
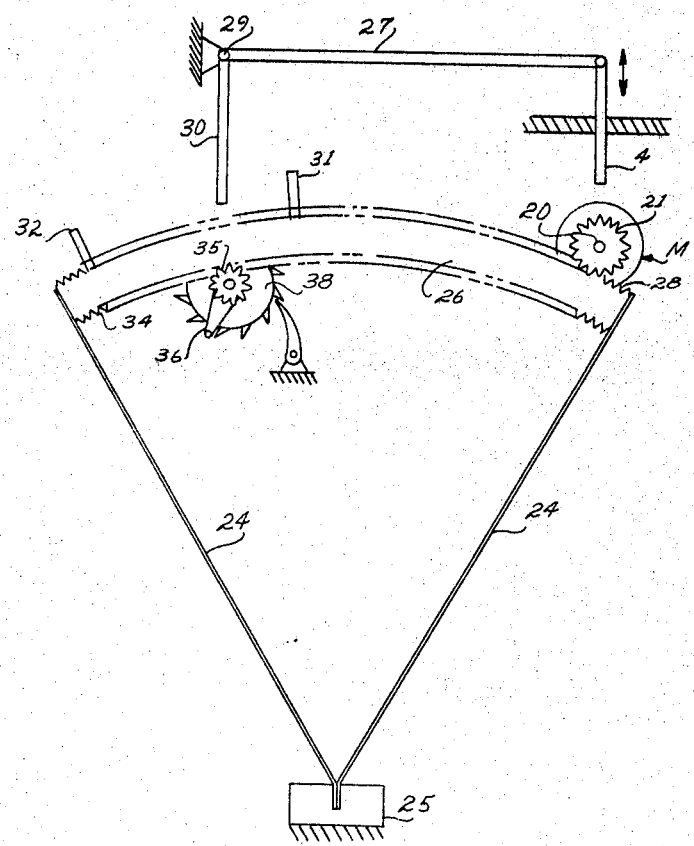
FIGURE 9 is a diagrammatic representation of use of the motor for a clock work.

While many mechanical spring movements may be used in practice for adapting the motor for use in indirectly driven clocks, FIGURE 9 schematically shows one means for winding a clock.

Spring blades 24 secured fast to a lower fixed mount 25 in V fashion have fixed on their upper ends a generally arcuate rack 26. Substantially clockwise motion of the rack about the mount stores energy in the blades and this motion is obtained by the motor M mounted in fixed position, the drive being through the pinion 21 engaging outer teeth 28 on the rack. The control magnet 4 is carried on a long armed bell crank on a fixed pivot 29 and having a short actuating arm 30 for engagement by studs 31 and 32 fast on the rack. The bell crank is detained selectively in two substantially fixed positions by detents (not shown) one position corresponding to remote position for the control magnet 4 and the other for inner or working position for closing the switch 1 of the motor which is the state shown in FIGURE 9. Continued running of the motor moves the rack and stud 32 clockwise until the latter engages the crank arm 30 with the result that the magnet 4 is raised out of effective position and current is no longer fed to the motor.

Next the rack returns anti-clockwise under the force of the blades 24. During this motion the motor is driven in the reverse direction and the rack, by inner teeth 34, drives a pinion 35 and, through a ratchet 36, spring barrel 38 containing an absorber spring so as to wind it slightly until the degree of wind of the barreled spring prevents any further motion of the rack to the left except as the blades 24 drive the clock works. Eventually, the stud 31 reaches the arm 30 and the motor is restarted, and the rack is again moved to the right with the ratchet slipping on the barrel.

The blades 24 are essentially the drive spring of the clock with the barrel 38 containing a spring which is primarily a storage spring operative only when the motor drives the rack.

Those skilled in the art may utilize simple means wherein the pinion 21 drives the barrel through a given angle for winding the spring therein after the barrel shaft has turned through the same angle.

The invention claimed is:

1. In an indirectly electrically powered timepiece, a rotor consisting essentially of two like discs being diametrically magnetized permanently along a plurality of equiangularly spaced radial planes to form equiangularly spaced poles of alternate polarity in each disc and of opposite polarity in the same radial plane on one side of the axis, a fixed stator coil between the discs and axially parallel therewith, a source of direct current for energizing the coil, a fixed magnetically sensitive reed switch interposed between the source and coil, the switch being so positioned as to be substantially in the field of a pair of poles when the axis of the coil is about angularly midway between a pair of poles of opposite polarity to close and afford a magnetic impulse to drive the rotor, a control magnet movable toward and away from the switch to regulate the effect of the rotor poles on the switch, a drive spring for an intermediate source of power to drive the works of the timepiece and having one end fixedly mounted, the spring being movable relative to said end back and forth between stressed and substantially unstressed positions, means for converting rotary motion of said shaft in one direction to movement of the drive spring from substantially unstressed to stressed position, means for converting movement of the spring from stressed to substantially unstressed position into rotary motion for driving the timepiece, ratchet mean for preventing backward drive of the timepiece when the spring moves from substantially unstressed to stressed position, and means for moving the control magnet relative to the switch and coil to a position to prevent closure of the switch by the rotor poles when the spring moves to stressed position and to cause closure by the rotor poles when the spring reaches substantially unstressed position.

2. In a timepiece as claimed 1, said spring being movable in a generally arcuate path between said substantially unstressed and stressed positions, the first mentioned means being a toothed arcuate member secured on the spring, and a pinion on the shaft and in mesh with the arcuate member.

3. In a timepiece as claimed in claim 2, the second mentioned means being a barrel and pinion the latter being engaged with the arcuate member.

References Cited

UNITED STATES PATENTS

| | | | |
|---|---|---|---|
| 2,492,435 | 12/1949 | Ostline | 318—254 |
| 2,753,471 | 7/1956 | Henninger et al. | 318—254 |
| 3,185,910 | 5/1965 | Knapp | 318—254 |
| 3,312,883 | 4/1967 | Reich | 318—132 |
| 3,328,659 | 6/1967 | Ryno | 318—138 |

ORIS L. RADER, *Primary Examiner.*

G. SIMMONS, *Assistant Examiner.*

U.S. Cl. X.R.

318—132; 335—207